(No Model.)
J. VAN VLECK.
ELECTRICAL MEASURING INSTRUMENT FOR SWITCHBOARDS.
No. 529,433. Patented Nov. 20, 1894.
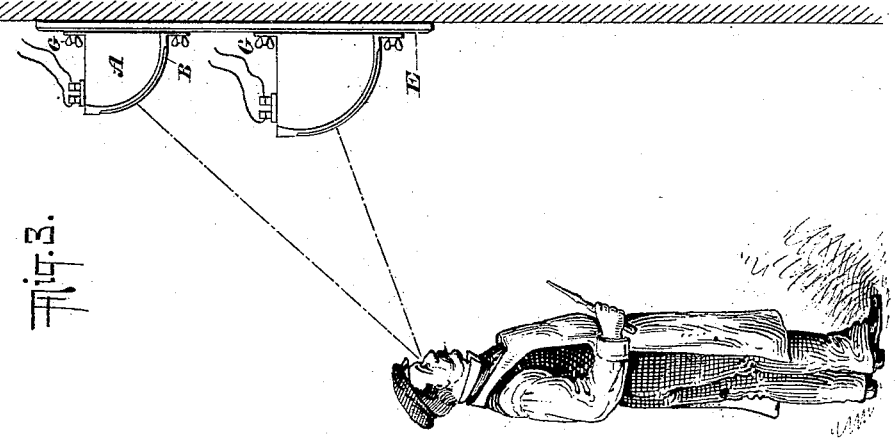
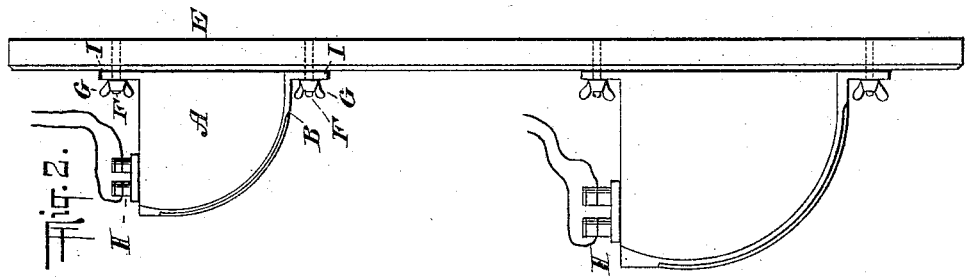
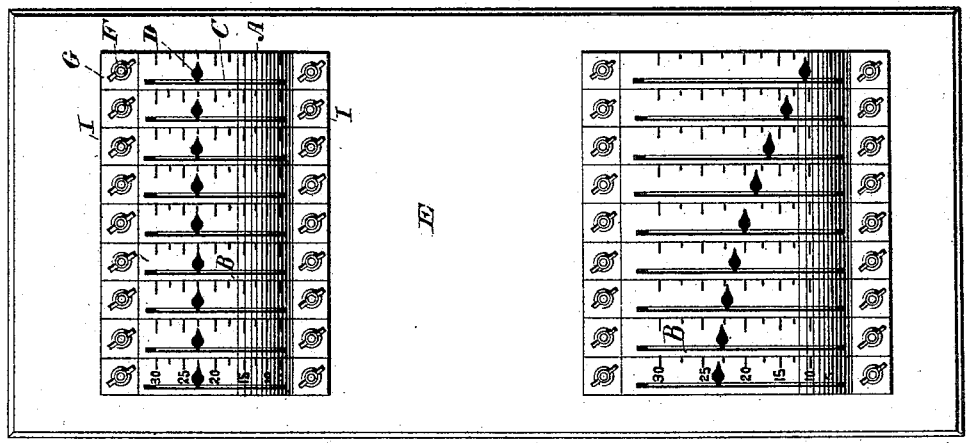
WITNESSES:
H. P. Moller
M. Bosch
INVENTOR
John Van Vleck
BY
Park Benjamin
his ATTORNEY.

UNITED STATES PATENT OFFICE.

JOHN VAN VLECK, OF NEW YORK, N. Y.

ELECTRICAL MEASURING-INSTRUMENT FOR SWITCHBOARDS.

SPECIFICATION forming part of Letters Patent No. 529,433, dated November 20, 1894.

Application filed April 14, 1894. Serial No. 507,618. (No model.)

*To all whom it may concern:*

Be it known that I, JOHN VAN VLECK, of the city, county, and State of New York, have invented a new and useful Improvement in Electrical Measuring-Instruments for Switchboards, of which the following is a specification.

Electrical measuring instruments, as hitherto constructed for switchboard use, have been made with their indicating scales and pointers disposed on their broadest side. Thus, for example, if the instrument were circular in form the scale and index needle would be on one circular flat face thereof, and not upon the curved periphery. It often happens, however, especially in large stations, that the space which can be given to a switchboard is comparatively small, while, on the other hand, it is necessary to group a very large number of instruments on such switchboards. It will be obvious that, with existing instruments, the number of them which can be placed upon any switchboard will be governed by the area of the indicating faces; and if, as already pointed out, these indicating faces are upon the side of the instrument of the largest area, then very much fewer instruments can be placed upon a switchboard than could be put there if the scale and index in each instrument were disposed on an edge thereof—or, in other words, on a face or surface of less area. A simple illustration of this is found in the ordinary placing of books on shelves. Obviously very much fewer books could be put in a bookcase if a side of each book had to be exposed than if, as of course is common, only the backs of the books were exhibited to view, the books being placed on the shelves with their flat sides in contact. So far as I am aware, however, no electrical measuring instruments, such as are used in practice, have been devised prior to my present invention which are capable of being combined with a switchboard and supported thereon in the manner set forth in the foregoing paragraph; that is to say, I know of no electrical measuring instruments having their scales and pointers upon their edges and having the broadest faces of their inclosing cases flat and hence capable of being placed with said broad faces in juxtaposition in a row, like books on a shelf.

My invention therefore consists, first, in an electrical measuring instrument having its scale and pointer upon one edge, in contradistinction to upon its broad face, and provided with means of attachment to a switchboard.

My invention further consists in the combination of a series of instruments so formed with a switchboard and placed together on said switchboard in such relation as that the exposed edges shall all lie in the same plane or substantially the same plane, presenting to the eye the several scales side by side, so that all can be seen at once.

My invention further consists in graduating these scales from bottom upward, so that the positions of the several pointers or indices on these scales, relatively to one another, may be seen at a glance and the observer may recognize the fact that those indexes or pointers which are higher up than others indicate an increase, for example, in electromotive force or current strength.

In the accompanying drawings, Figure 1 represents a face view of a portion of a switchboard showing two series of instruments, the instruments in each series being placed side by side so as to expose their curved edges, on which are marked the scales. Fig. 2 is a side view and Fig. 3 is also a side view similar to Fig. 2, and shows the arrangements of the instruments of the particular shape herein represented with respect to the line of sight of the eye of an observer below them.

Similar letters of reference indicate like parts.

I will first describe a form of instrument adapted to the purposes in view. It is to be understood, however, that I may very greatly modify this form, and that the particular form here illustrated is only one out of many which may be employed for the purpose. The case of the instrument is substantially segmental in shape, and its broad triangular sides are flat, as shown at A. The exposed edge B of the instrument is here in the form of an arc. The two sides A are parallel. Upon the face B the scale is applied in any suitable way.

In said face B is a slot, C, through which passes the indicating needle or pointer, the outer extremity of which, D, is suitably turned or bent at right angles, so that, as the index is moved by the mechanism within the instrument, the end D is caused to traverse the scale.

E is a portion of the switchboard or wall, to which the instrument is attached by means of lugs, I, which receive screw-bolts F on the switchboard E and are secured thereto by nuts, G.

The nature of the mechanism within the instruments is immaterial, so long as it is competent to cause the pointer to move over the scale. The several instruments are placed with their broad faces, A, in juxtaposition on the switchboard E, as shown in Fig. 1.

It will be seen that the exposed curved edges, B, of the series of instruments lie all in the same curved plane, and that by reason of the placing of the instruments in the manner described a great many more of them can be disposed upon the switchboard than if the broad faces A were outward.

The object of making the instruments in the form here represented is to enable them to be placed conveniently on the switchboard at elevations above the eye of the observer, as shown in Fig. 3, and still have the scales disposed conveniently to the lines of sight indicated by the dotted lines in said figure.

It will be apparent from Fig. 1 that the scale-marking of the several instruments is lowest at the bottom of the scales and highest at the top, so that, as the current strength or pressure increases, the several pointers move upward.

The lower series of instruments in Fig. 1 may represent ammeters, each one of which may be connected with a separate feeder or branch of the main system. Therefore each ammeter will show the current strength on that feeder or branch. It will be seen that the index on the instrument at the left of the series of ammeters is at a higher point on the scale than is the index on the right of the series, and that the several indexes, considered together, appear on a curved line, thus showing that the currents on the several feeders are of different strengths. The observer, therefore, can see at a glance the strength of current on any branch of a system at any moment, and also how the strength of current on that branch compares with the strength on other branches, and thus can recognize how his whole current is being distributed. So also he can at once recognize, simply by the change in shape of the line formed by the ends of the pointers, any alteration in the relative distribution of current strength, and this without going close to the instruments to note exactly the scale markings. This is a great convenience in stations where it may be more material, at any moment, to recognize the fact of a difference in distribution than exactly how much this difference amounts to, although, even as to that, an approximate idea is at once gained by the shape of the line formed by the indexes. The upper range of instruments shown in Fig. 1 may represent voltmeters, each connected, as before, with the several feeders. As it is generally desirable to keep the electrical pressure constant, that fact is indicated, as shown in the drawings, by the indexes D placing themselves in a straight line transversely the exposed faces. As long as the pressure remains constant in the several feeders that line remains straight. If that pressure varies in any branch, then the index in the instrument connected to that branch moves either up or down, and the line is no longer straight, but irregular—a fact which is at once perceptible at a glance. Consequently, with instruments arranged in this way, the station attendant can see, immediately, the whole load upon his system, the amount of load in each branch and the relative distribution of the load in the several branches, and may immediately recognize any change therein. So also he can perceive the pressure on the system, the pressure in each branch, the pressure in one branch relative to another and also any change.

Another advantage gained is a material diminution in the length of conductors to the instruments, and hence a reduction of the losses incident to the use of long conductors in the station itself, besides the saving in material.

The binding posts are shown at H in Figs. 2 and 3. They are omitted for purposes of clearness in Fig. 1.

I claim—

1. An electrical measuring or indicating instrument having an elongated scale-plate and a pointer or index moving over said scale; the said instrument being constructed and arranged so that no part thereof protrudes laterally beyond parallel planes including the longitudinal edges of said scale-plate.

2. An electrical measuring or indicating instrument having an elongated scale-plate and a pointer or index extending through a slot in said plate and moving over said scale; the said instrument being constructed and arranged so that no part thereof protrudes laterally beyond parallel planes including the longitudinal edges of said scale-plate.

3. An electrical measuring or indicating instrument having an inclosing case provided with an external periphery of less width than the sides of said case, a scale on said periphery and a pointer or index moving over said scale.

4. The combination of a wall, switchboard, or other plane surface, an elongated scale-plate supported thereon and at a distance therefrom, an index moving over said scale-plate, and, interposed between said scale-plate and said wall, the operating mechanism of an electrical measuring or indicating instrument, whereby said index is actuated; the said parts being constructed and arranged so that no part of said operating mechanism protrudes laterally beyond parallel planes at right angles to said wall and including the longitudinal edges of said scale-plate.

5. The combination of a wall, switchboard, or other plane surface, two or more elongated scale-plates supported thereon, at a distance therefrom and disposed in the same plane, an index moving over each scale-plate, and interposed between each scale-plate and said wall the operating mechanism of an electrical measuring or indicating instrument, whereby said index is actuated; the said scale-plate and associated mechanism of each instrument being constructed and arranged so that no part of said operating mechanism protrudes laterally beyond parallel planes at right angles to said wall and including the longitudinal edges of said scale-plate.

6. The combination of a wall, switchboard, or other plane surface, two or more electrical measuring or indicating instruments each provided with an inclosing case having a periphery narrower than its sides or faces, a scale on said periphery and an index or pointer moving over said scale; the said instruments being disposed with their broad faces in juxtaposition secured to said wall with their scales outward.

7. A vertical support and, disposed thereon, a series of electrical measuring or indicating instruments each provided with an elongated scale-plate and an index moving over said scale; the said scale-plates being disposed in juxtaposition in the same plane, the said scales being similarly marked and the indications thereon increasing in magnitude from down, up, and the said indexes moving in parallel vertical paths.

8. A support, and, disposed thereon, a series of electrical measuring or indicating instruments each provided with an elongated scale-plate and an index moving over said scale; the said scale-plates being disposed in juxtaposition in the same plane, the said scales being similarly marked and the said indexes moving in parallel paths.

9. In combination with an electric distributing system having several branches or feeders, an electrical measuring or indicating instrument in circuit with each branch, the said instruments having similarly marked elongated scale-plates disposed in the same plane with their longitudinal edges in juxtaposition, and indexes moving in parallel paths over said scales.

10. An apparatus for determining visually the relative distribution of load or pressure in the several branches of an electric distributing system, which consists in a number of electrical measuring or indicating instruments disposed one in each branch of the system provided with similarly-marked, elongated scale-plates disposed in the same plane with their longitudinal edges in juxtaposition and indexes moving over said scales in parallel paths; the said indexes, when at corresponding marks on their several scales, being disposed in a substantially straight horizontal line; whereby variations in distribution of load or pressure in the system are shown by relative changes in position of said indexes and consequent alterations in the configuration of said line.

11. In an electrical measuring or indicating instrument a case having two sides or faces, A, flat and parallel and a portion, B, of its periphery rounded or disposed at an angle to the remainder of said periphery, a scale on said part B, and an index or pointer moving over said scale.

12. In combination with a vertical wall, switchboard, or other plane surface, an electrical measuring or indicating instrument supported thereon, having its parallel sides, A, at right angles to said wall, a rounded periphery, B, having a slot or opening, a scale on said periphery, and an index or pointer extending through said slot and moving over said scale.

13. In combination with a vertical wall, switchboard, or other plane surface, an electrical measuring or indicating instrument having a flat part of its periphery in contact with and supported upon said wall and another part, B, disposed at an angle to said first part and provided with a slot or opening, a scale on said part B and an index or pointer extending through said slot and moving over said scale.

JOHN VAN VLECK.

Witnesses:
H. R. MOLLER,
M. BOSCH.